Figure 1:
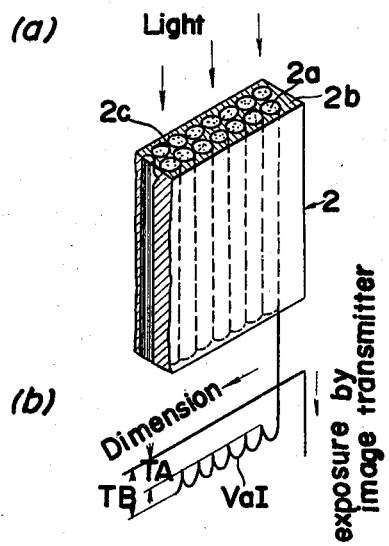

United States Patent [19]
Tanaka et al.

[11] 3,977,777
[45] Aug. 31, 1976

[54] IMAGE TRANSMISSION DEVICE FOR SLIT SCANNING TYPE PHOTOCOPYING MACHINE

[75] Inventors: Atsuyuki Tanaka; Susumu Tanaka, both of Sakai, Japan

[73] Assignee: Minolta Camera Kabushiki Kaisha, Osaka, Japan

[22] Filed: Oct. 30, 1974

[21] Appl. No.: 519,212

[30] Foreign Application Priority Data
Nov. 7, 1973 Japan............................ 48-128721

[52] U.S. Cl........................................ 355/1; 355/8; 355/69; 355/70
[51] Int. Cl.².................... G03B 27/00; G03B 27/76
[58] Field of Search................... 355/1, 8, 67, 69, 70

[56] References Cited
UNITED STATES PATENTS

| | | | |
|---|---|---|---|
| 3,125,013 | 3/1964 | Herrick et al............................ | 355/1 |
| 3,175,481 | 3/1965 | Lahr........................................ | 355/1 |
| 3,398,669 | 8/1968 | Hicks...................................... | 355/1 |
| 3,535,036 | 10/1970 | Starkweather..................... | 355/16 X |
| 3,540,806 | 11/1970 | Starkweather..................... | 355/17 X |
| 3,658,407 | 4/1972 | Kitano et al......................... | 355/1 X |
| 3,659,935 | 5/1972 | Moraw.................................... | 355/1 |
| 3,705,768 | 12/1972 | Moraw et al........................... | 355/8 |

*Primary Examiner*—Richard A. Wintercorn
*Attorney, Agent, or Firm*—Wenderoth, Lind & Ponack

[57] ABSTRACT

An image transmission means for employment in a photocopying machine wherein a document to be copied is scanned and image-wise light reflected therefrom is directed onto a photosensitive medium which is moved at a speed equal or proportional to the document scanning speed. The image transmission means comprises an image-transmitting light-conducting fiber array which transmits image light reflected from a document onto a photosensitive medium, and is so mounted that photosensitive medium portions which are less exposed due to characteristic variation in light transmission efficiency of different portions of the fiber array are disposed longitudinally with respect to the document image. Illumination of a document is provided by one or two tubular alternating current fluorescent lamps which are actuated to provide illumination which varies at a frequency and to a proportion that are selected with reference to the characteristic variations of different portions of the light-conducting fiber array. On the photosensitive medium, and hence on a subsequently produced document copy, variations due to alternation of document illumination occur transversely with respect to the image of the scanned document; that is at right-angles to the variations due to light-conducting fiber array characteristics. There is thus produced an image constituted by mesh portions.

3 Claims, 6 Drawing Figures

IMAGE TRANSMISSION DEVICE FOR SLIT SCANNING TYPE PHOTOCOPYING MACHINE

The present invention relates to an image transmission means, and more particularly to an image transmission means for employment in a slit scanning type photocopying machine.

Recently, a principal object in the manufacture of photocopying machines has been to provide machines that are compact, as well as making it possible to obtain clear copies of original documents.

One method of permitting more compact construction of a photocopying machine is to employ in the optical system thereof an array of image transmitting optical fibres, such as that produced by the Nippon Sheet Glass Co., Ltd. under the trade name of SELFOC, for the transmission of light reflected from a document to be copied onto charged electrophotosensitive material to form an electrostatic image thereon. Subsequent stages in production of a copy of a document include, for example, dusting the charged electrophotosensitive material carrying an electrostatic image with oppositely charged toner particles, which adhere to the electrophotosensitive material in a pattern corresponding to the electrostatic image, transfer of the particles onto a sheet of charged copy paper, to produce a positive image of the document to be copied, removal of the copy paper from the machine, and cleaning of the electrophotosensitive material of residual toner particles in readiness for obtaining another copy.

SELFOC lens (registered trademark), or imagetransmitting optical fibre is made of glass or synthetic resin, there is a refractive index distribution in a cross section that varies parabolically outwards from the centre of the fibre, and is defined by the following equation $n = no (1 - ar^2)$, wherein $no$ is the refractive index at the centre, $n$ is the refractive index at a distance $r$ from the centre, and $a$ is positive constant of proportionality. The SELFOC lens and the image transmitter formed by a bundle of SELFOC lenses are discribed in the U.S. Pat. No. 3,658,407, patented on Apr. 25, 1972, and therefore, reference may be made thereto for the details thereof.

A practical image transmitter consists of a plurality of said image-transmitting optical fibres, which are held closely bundled together, in a staggered file arrangement, for example, by synthetic resin or other suitable binder, and the corresponding opposite ends of which constitute an image receiving surface and an image emitting surface, which, when the image transmitter is employed in a photocopying machine, respectively receive image-wise light reflected from a document to be copied and emit this light onto a photosensitive material to form an electrostatic image thereon, and permit subsequent production of a copy of the document. Such an image transmitter array which is shown in cross-section in FIG. 1, comprises a plurality of image transmitting light-conducting fibres 2a, which are arranged in a side by side relationship and parallel with one another, in a bundled configuration, the fibres 2a being maintained in this configuration by a bonding material 2c. The properties of each individual optical fibre in the image transmitter array being as described following, supposing there is an even illumination of the image transmitter receiving surface by light reflected from a document, exposure onto the photosensitive material by light emitted from the emitting surface of the image transmitter varies in a wave-like manner, as shown schematically in FIG. 1, wherein an image transmitter 2 composed of image transmitting light-conducting fibres 2a and surfaces 2b of the array is indicated as receiving light reflected from a document, not shown, on the opposite surface of the array, and transmitting this light onto a photosensitive material. With a representative high-quality image transmitter, the wave-wise variation VaI in exposure onto the photosensitive material has a wave-length corresponding to the diameter of individual fibres, which approximately 0.5mm, and in even illumination of surface 2b, the ratio of minimum exposure TB to maximum exposure TA is $TB/TA = 0.93$. This wave-wise variation is of course transferred onto the copy paper, and is sufficiently regular and marked to be perceptible.

Meanwhile the conventional method most commonly employed to improve reproduction of continuous graduation in electrophotography has been to provide a mesh screen between a document to be copied and the photosensitive material. This method effectively results in the production of an image with good continuous gradation, but has a major disadvantage that to produce the same degree of illumination of the photoelectric material, the amount of light which must be produced by a source for providing initial illumination of a document when a screen is used is as much as five times that which needs to be produced when a screen is not used. Consumption of electricity is therefore high, and there is also liable to be excessive heating of the interior of a copying machine and consequent deterioration of sensitive elements in the copying machine, particularly the photosensitive material. Further this method is troublesome to apply to a slit scanning type photocopying machine employing in the optical system an array of image-transmitting optical fibres.

It is accordingly an object of the present invention to provide an image transmitting means, which, in a photocopying machine wherein successive portions of a document to be copied are scanned through a slit or shutter means, permits production of document copies having good continuous gradation.

It is another object of the invention to provide an image transmission means which is economical in its use of electricity.

It is a further object of the invention to provide an image transmission means which permits easy assembly and maintenance.

Figure 2:
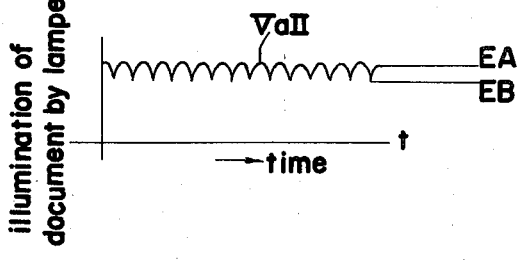
Figure 4:
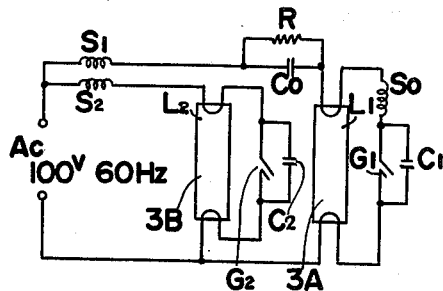
Figure 3:
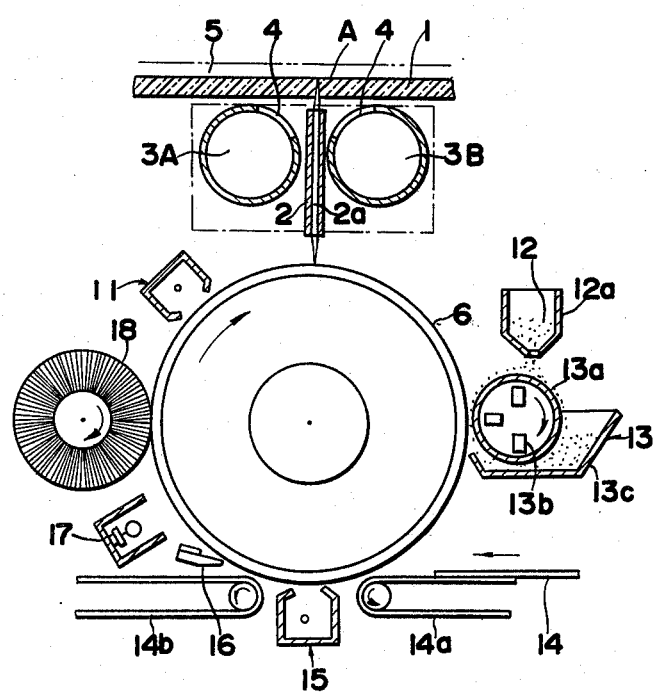
Figure 5:
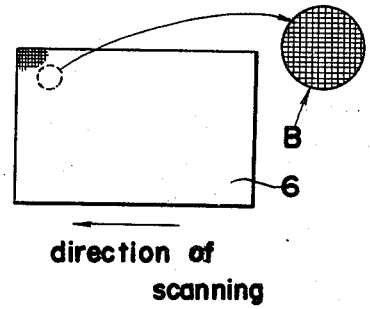

A better understanding of the present invention may be had from the following full description when read in reference to the attached drawings, in which FIG. 1(a) is a perspective view, partially in cross-section, of an image transmitter array to be employed in a photocopying machine according to the present invention, FIG. 1(b) is a schematic view for illustrating the light transmission efficiency characteristics of the image transmitter array of FIG. 1(a), FIG. 2 is a graph of document illumination variations being affected by means of illumination lamps to be employed in the photocopying machine of the present invention, FIG. 3 is a cross sectional view showing disposition of an image transmission means in the photocopying machine of the present invention, FIG. 4 is a lighting circuit diagram associated with the illumination lamps of FIG. 2, and FIG. 5 is a plan view of a mesh pattern on the photosensitive material formed by the image transmission means of the present invention.

Referring to FIGS. 1 and 2 the principle of the present invention is that there are produced in the image formed in a photosensitive medium, and hence on a completed copy of a document, wave-wise variations VaII such as graphed in FIG. 2 which are produced due to alternating variations in the degree of illumination of a document during scanning thereof, and which are similar to and occur at right-angles to the variations VaI produced due to fibre array characteristics illustrated in FIG. 1. Variations VaII are produced by alternating the potential to light an illumination lamp or lamps from a maximum EA to minimum EB. The frequency of this alternation is made such that, for a given document scanning speed, there are produced on the photosensitive medium variations VaII having the same wave-length as variations VaI produced by the image transmitter 2. These two variations VaI and VaII are further matched by making the minimum to maximum lighting potential ratio EB/EA close to the TB/TA ratio of variations VaI. In this manner, different portions of an image of a document produced on a photosensitive medium are constituted by mesh portions defined by matched variations VaI and VaII at right-angles to one another, there thus being produced an image having good continuous gradation.

Reference is now had FIGS. 3 and 4 which illustrate main portions of one embodiment of the invention.

In FIG. 3, an image transmitter 2 constituted by a plurality of image-transmitting light-conducting fibres 2a is shown in a vertical alignment below a horizontal document rest 1 supporting a document 5. In line with the upper, light from lamps 3A and 3B described below illuminate a document portion A, and image light is reflected from a document portion A into the image transmitter 2. The photocopying machine includes conventional means not shown for moving the document 5 relative to a stationary image transmitter 2, and lamps 3A and 3B, whereby the entirety of the document 5 may be scanned and image light from consecutive portions A thereof be reflected downwards into the image transmitter 2. This image light is transmitted by the image transmitter 2 onto a photosensitive medium 6 which is provided below the image transmitter 2, and is moved past the transmitter 2 at a speed equal to the document scanning speed if a copy of unity magnification is required, or at other speeds proportionate to document scanning speed if copies of other magnifications are required, and on which there is thereby formed an electrostatic image corresponding to the contents of the document 5. The document 5 image is subsequently transferred onto a sheet of copy paper in a known manner, for example, by the agency of charged toner particles. Image light reflected from the document 1 is directed into the vertically aligned image transmitter 2 and, then, onto the photosensitive medium 6 constituting the outer surface of a drum 10 which is rotatable about a horizontal axis. When the drum 10 is rotated, successive portions thereof are brought into line with a charging station 11, including, for example, a corona discharger for imposing a uniform charge on the electrophotosensitive medium 6. After this the charged drum portions are brought into line with the image transmitter 2, which directs image light onto the electrophotosensitive medium 6 to form thereon an electrostatic image in correspondence with the contents of the document 1. The drum 10 is then carried past a developing station 13, comprising a rotary sleeve 13a which is made of an electrically conductive material and has provided therein permanent magnets 13b, and which charges toner particles 12 supplied thereonto from a suitably located hopper 12a, and by rotation, causes the toner particles 12 to contact the drum 10, certain of the charged toner particles 12 adhering to the electrophotosensitive medium 6 in a pattern defined by the electrostatic image, and the remaining particles 12 falling into a retainer box 13c surrounding the lower half of the rotary sleeve 13a The electrostatic image portions of the drum 10 thus coated are then carried past a transfer station 15, whereat copy paper 14 supplied thereto by a feed-in belt 14a, is charged by a corona discharger, and has transferred thereonto the toner particles 12, which are oppositely charged, whereby there is formed on the copy paper 14 an image corresponding to the contents of the original document 1. The copy paper 14 adheres slightly to the drum 10 and is carried thereby past the transfer station 15, and into contact with a separator pawl 16, which separates the copy paper 14 from the drum 10, copy paper 14 being subsequently transferred out of the photocopying machine by a feed-out belt 14b. Meantime the drum 10 is carried past a so-called eraser lamp 14, which cancels remnant electrical charge on the drum 10. Then remnant toner particles 12 on the drum 10 are completely removed by a rotary cleaner brush 18, which makes the electrophotosensitive medium 6 clean, and ready for charging again at the charging station 11, and for effecting production of another document copy.

The lamps 3A and 3B are suitably reflector-type tubular alternating current fluorescent lamps which are disposed symmetrically on opposite sides of the image transmitter 2, below the document rest 1. Each lamp 3A and 3B comprises a reflective film which covers the entire outer or inner surface thereof except for a light emission slit 4, which is disposed parallel to the lamp longitudinal axis, and via which light is directed onto the document 1. Each lamp 3A and 3B is preferably mounted in a position such that the centre of the light emission slit 4 and the central axis of the lamp lie on a straight line which is at 45° to the horizontal. The lamps 3A and 3B are caused to light by the circuit shown in FIG. 4 in such a manner that, during scanning of the document 5, document portions A are continuously illuminated, but at sinusoidally varying degrees of illumination, as illustrated in FIG. 2.

Referring to FIG. 4, there is shown a conventional two-lamp flickerless lighting circuit for supplying leadig current to lamp 3A and lagging current to lamp 3B. The lighting circuit comprises a lamp 3A ballast circuit comprising a starting compensation coil So in series with a bank having a glow lamp G1 and a noise suppressor capacitor C1 in parallel. The lamp 3B is in parallel to lamp 3A and has a ballast circuit consisting of a glow lamp G2 and noise suppressor capacitor C2 in parallel. Power is supplied to the filament coils L1 and L2 of the lamps 3A and 3B respectively from a single AC 100V 60Hz source, lamp 3A being supplied through a choke coil S1 in series with a parallel bank consisting of a discharge resistor R and a phase advancing capacitor Co, and lamp 3B being supplied through a choke coil S2 in parallel to the choke coil S1.

The values of the various elements of the circuit of FIG. 4 may be changed in accordance with image transmitter 2 characteristics to produce a document image constituted by a plurality of mesh patterns such as illustrated in the enlarged portion B of FIG. 6, in which the effects of striation due to image transmission variations VaI are at right-angles to striation effects produced by illumination variations VaII, the two types of striation effects thus mutually making one another non-apparent to produce an image wherein all portions have good gradation.

For example, with a document scanning speed of 120mm/second, and lighting potentials supplied by the circuit of FIG. 4 to green-light fluorescent tubes 3B and 3A being in the ratio $EB/EA = 0.93$, there is obtained on the photosensitive medium 6 an image mesh constituted by lines at a 0.5mm pitch both parallel to and at right-angles to the direction of document scanning. A mesh of the same size is also obtained when $EB/EA = 0.95$, and there is employed an image transmitter 2 constituted by bundled 1mm diameter fibres which are in a staggered file arrangement, and for which the refractive index at centre $no = 1.48$, the proportional constant $a = 0.02$, and the working distance is 5mm.

The invention thus provides an illumination means which makes positive use of what is normally considered an undesirable characteristic of image transmission light-conducting fibre arrays, and makes it possible to obtain mesh patterns for production of images by a photocopying machine without there being the expense and trouble of mounting a separate screen.

Needless to say, the abovedescribed means may be modified in various ways without departure from the scope of the invention. For example, there may be provided only one fluorescent lamp, the light output of which is varied continuously. The scope of the invention should therefore be determined from the following claims.

What is claimed is:

1. An image transmission device for slit scanning type photocopying machine comprising:

means for illuminating a document to be copied including at least one fluorescent lamp having a slit for emission of light therethrough to illuminate the document, an electrical circuit connected with said fluorescent lamp for supplying alternating potential thereto for causing said lamp to emit varying intensities of illuminating light therefrom with the amount of said light varying in accordance with said alternating potential, means for scanning the document including an array constituted by a plurality of light transmitting light conducting fibers arranged in an elongated bundle extending in a direction transverse to the direction of scanning, the array and the document being relatively movable in the direction of scanning during the scanning, whereby the intensity of the light reaching an image receiving surface through said light conducting fibers varies with a variation corresponding to the positions of the individual fibers in the array in a direction transverse to the scanning direction due to the properties of the light conducting fibers and varies with a variation corresponding to the varying intensities of light from said lamp in the direction of scanning due to the variation in the intensity of the light emitted by said lamp, for forming a mesh-pattern effect at the image receiving surface.

2. An image transmitting device as claimed in claim 1, wherein the variations in the intensity of light due to the properties of the light conducting fibers are regular periodic variations and having a ratio of the maximum intensity to the minimum intensity, and said electric circuit is constituted by elements for supplying a potential to said lamp for giving to the intensity of the light emitted from the lamp the same period of variation and the same ratio of maximum intensity to minimum intensity as for the variations due to the properties of the light conducting fibers.

3. An image transmission device as claimed in claim 1,wherein said means for illuminating a document has two fluorescent lamps symmetrically provided on opposite sides of said array and said electric circuit supplies alternating electric potential to said lamps for causing the intensities of light emitted by said lamps to be opposite in phase to each other.

* * * * *